US008996280B2

(12) United States Patent
Joos et al.

(10) Patent No.: US 8,996,280 B2
(45) Date of Patent: Mar. 31, 2015

(54) METHOD FOR OPERATING A FUEL INJECTOR OF AN INTERNAL COMBUSTION ENGINE, AND CONTROL DEVICE FOR AN INTERNAL COMBUSTION ENGINE

(75) Inventors: Klaus Joos, Walheim (DE); Ruben Schlueter, Stuttgart (DE); Jens Neuberg, Stuttgart (DE); Helerson Kemmer, Vaihingen (DE); Holger Rapp, Ditzingen (DE); Haris Hamedovic, Moeglingen (DE); Joerg Koenig, Stuttgart (DE); Anh-Tuan Hoang, El Paso, TX (US); Bernd Wichert, Kernen (DE); Achim Hirchenhein, Trierweiler (DE)

(73) Assignee: Robert Bosch GmbH, Stuttgart (DE)

( * ) Notice: Subject to any disclaimer, the term of this patent is extended or adjusted under 35 U.S.C. 154(b) by 658 days.

(21) Appl. No.: 13/319,971

(22) PCT Filed: May 3, 2010

(86) PCT No.: PCT/EP2010/055957

§ 371 (c)(1), (2), (4) Date: Jan. 27, 2012

(87) PCT Pub. No.: WO2010/133441

PCT Pub. Date: Nov. 25, 2010

(65) Prior Publication Data

US 2012/0152207 A1 Jun. 21, 2012

(30) Foreign Application Priority Data

May 19, 2009 (DE) ........................ 10 2009 003 214

(51) Int. Cl.
*B60T 7/12* (2006.01)
*G05D 1/00* (2006.01)
(Continued)

(52) U.S. Cl.
CPC ............. *F02D 41/20* (2013.01); *F02M 47/027* (2013.01); *F02D 2041/2051* (2013.01); *F02D 2041/2055* (2013.01)
USPC ........... 701/103; 701/104; 701/114; 123/478; 123/479; 123/480; 123/486

(58) Field of Classification Search
CPC ......... F02D 41/02; F02D 41/04; F02D 41/20; F02D 41/26; F02D 41/263; F02D 41/30; F02D 41/3005; F02D 2041/2058; F02D 2041/2062; F02M 65/005
USPC .......... 701/103, 104, 114, 115; 123/472, 478, 123/480, 479, 486, 490
See application file for complete search history.

(56) References Cited

U.S. PATENT DOCUMENTS 4,612,597 A 9/1986 Hamren
5,182,517 A 1/1993 Thelen et al.
(Continued)

FOREIGN PATENT DOCUMENTS

CN 1982676 6/2007
DE 39 42 836 6/1991
(Continued)

OTHER PUBLICATIONS

International Search Report for PCT/EP2010/055957, dated Aug. 30, 2010.

*Primary Examiner* — Erick Solis
*Assistant Examiner* — Anthony L Bacon
(74) *Attorney, Agent, or Firm* — Kenyon & Kenyon LLP

(57) ABSTRACT

In a method for operating a fuel injector, a transition range of the characteristics curve of the injector is detected individually and adapted continuously, so that a monotonous characteristics curve is formed, with whose aid high metering precision of the injector is achieved.

11 Claims, 4 Drawing Sheets

(51) Int. Cl.

| | |
|---|---|
| ***G06F 7/00*** | (2006.01) |
| ***G06F 17/00*** | (2006.01) |
| ***F02D 41/20*** | (2006.01) |
| ***F02M 47/02*** | (2006.01) |

(56) References Cited

U.S. PATENT DOCUMENTS

| | | | | |
|---|---|---|---|---|
| 2006/0102154 | A1* | 5/2006 | Ricco et al. | 123/472 |
| 2006/0201488 | A1* | 9/2006 | Kohler et al. | 123/479 |
| 2006/0231077 | A1* | 10/2006 | Ricco et al. | 123/478 |
| 2007/0131789 | A1* | 6/2007 | Ricco et al. | 239/5 |
| 2008/0243358 | A1* | 10/2008 | Kojima et al. | 701/102 |
| 2013/0019842 | A1* | 1/2013 | Shaver et al. | 123/478 |

FOREIGN PATENT DOCUMENTS

| | | |
|---|---|---|
| DE | 10 2004 015 745 | 10/2005 |
| DE | 10 2007 025 619 | 12/2008 |
| DE | 10 2008 042 556 | 4/2010 |
| JP | 2001-12284 | 1/2001 |

* cited by examiner 10
101
102
104
105
106
107
108
109
110
111
112
113
114
115
116
I
22

METHOD FOR OPERATING A FUEL INJECTOR OF AN INTERNAL COMBUSTION ENGINE, AND CONTROL DEVICE FOR AN INTERNAL COMBUSTION ENGINE

BACKGROUND OF THE INVENTION

1. Field of the Invention

The present invention relates to a control device and a method for operating a fuel injector of an internal combustion engine.

2. Description of Related Art

Internal combustion engines operating according to the Otto or Diesel method and injecting fuel directly into the combustion chamber of the internal combustion engine are especially advantageous with regard to efficiency, emission behavior and power output. In order to utilize the advantages of this so-called direct injection to the fullest extent possible, highest demands are made on the metering accuracy of the injectors, especially when small injection quantities are involved, in particular in the case of jet-directed combustion methods.

The metering of minute fuel quantities is required especially during multiple injections, in particular for the startup, warm-up and heating of the catalytic converter of the internal combustion engine. Furthermore, the requirements on the metering precision are increased even further by the increasing injection pressures. From published German patent application document DE 10 2004 015745 A1, a method for operating an injector and for determining the time of flight of the valve needle of the injector is known, to which reference is made hereby.

The injectors known from the related art have a characteristic curve of the time of flight of the valve element of the injector as a function of the actuation period, which basically is able to be subdivided into three ranges. As a rule, there is a direct correlation between the time of flight and the injected fuel quantity: the longer the time of flight, the greater the injected fuel quantity under unchanged marginal conditions.

In a first range, the so-called partial travel range, the injector is actuated only very briefly, and a characteristics curve segment results that rises monotonously but not always linearly. In a second range, the so-called transition range, the time of flight drops again with an increasing actuation period of the fuel injector, so that a first point of inflection, or a local maximum, is attained between partial travel range and the transition range.

This transition range ends at a second point of inflection, or a local minimum. A third characteristics curve segment begins at an actuation period that is greater than actuation period $T_2$ associated with the second point of inflection, in which third segment the characteristic curve of the time of flight rises monotonously again and has an extremely linear characteristic.

Since the position of the transition range and the times of flights of the valve element associated with the first and second points of inflection are individual for each injector and also vary across the service life of the injector, it is currently not possible to represent the partial travel range and the transition range of the characteristic curve for actuating the injector, in particular for metering minute injection quantities, with the required accuracy. This is the reason why currently only the so-called full travel range is triggered with regard to the characteristic curve, which makes it impossible to meter minute fuel quantities.

BRIEF SUMMARY OF THE INVENTION

The present invention is based on the objective of expanding the application range of the injectors especially in the direction of small and minute injection quantities, and of increasing the metering precision.

According to the present invention, this objective is achieved in that the transition range of the characteristic curve is determined individually for each injector and suppressed or skipped during operation of the internal combustion engine. As a result of the method according to the present invention, a monotonously rising characteristic curve is formed between the actuation period and the time of flight, or the valve element of the injector or the injection quantity. The operating or application range within which fuel injection quantities are able to be metered is able to be expanded considerably in this way. In particular, shorter actuating periods and consequently smaller injection quantities are realizable as a result. Another advantage is that the metering precision is improved.

In a further advantageous development of the present invention, transition range ÜB is delimited by a first point of inflection WP1 and a second point of inflection WP2, or a local maximum and a local minimum of a characteristic curve of the time of flight of a valve element of the fuel injector as a function of the actuating period.

Both the points of inflection and the local extreme values are able to be determined by a multitude of methods known from the related art, using the nodes of the characteristics curve, thereby making it possible to determine the transition range for each injector individually. Moreover, it is also possible to determine the points of inflection and/or the extreme values regularly during operation of the internal combustion engine and across the entire service life of the injectors, and corrections may be made, if necessary, so that drift of the operational performance of the injectors is able to be detected and taken into account for the actuating period. This makes it possible to realize constantly high metering precision across the entire service life of the internal combustion engine and the injector, and thus also to comply with the legally mandated emission limit values across the entire service life of the internal combustion engine.

The method according to the present invention is based on methods for determining the time of flight of the valve element of an injector, which are known from published German patent application document DE 10 2004 015745 A1, for instance. The time of flight of the valve element is ultimately determined in that the current and/or the voltage characteristic at the terminals of the injector is recorded with high time resolution and then analyzed. Thus, this too, requires no additional hardware, and the method is able to be repeated regularly while the internal combustion engine is running, so that the determination of the characteristics curves is able to take place at regular intervals across the entire service life of the internal combustion engine, and the resulting points of inflection or local maximums/minimums are able to be determined.

A relatively simple method for determining the first point of inflection and/or the second point of inflection of the characteristics curve of the fuel injector provides that the times of flights associated with different actuating periods of the injector be determined, and the actuating periods and the associated times of flights be used for generating a characteristics curve. In a further step, this characteristics curve is subdivided into ranges which feature monotonous changes in the times of flight at varied actuating periods, especially a partial travel range TH, a transition range ÜB, and a full travel range VH. According to the present invention, these ranges are delimited from each other by a point of inflection or a local extreme value. Thus, according to the present invention, the transition range is able to be ascertained by methods known per se in order to determine points of inflection and/or local extreme values. As a result, the method according to the present invention makes it easy to determine the first and the second point of inflection or a local maximum and a local minimum at all times while the internal combustion engine is in operation, without requiring additional hardware, thereby determining the transition range of the characteristics curve on the basis of these values and implementing the method according to the present invention.

A specific time of flight FDWP1 is able to be assigned to the first point of inflection or the local maximum. Correspondingly, it is possible to assign a time of flight FDWP2 to the second point of inflection or the local minimum. In this context, time of flight FDWP1 at the first point of inflection is greater than time of flight FDWP2 at the second point of inflection. For only then will there be a transition range in the characteristics curve, within which the characteristics curve does not rise monotonously. In order to then arrive at a monotonous characteristics curve of the injector, in the present invention a switch takes place from using the characteristics curve in partial travel range, to using the characteristics curve in full travel range, if the desired time of flight resulting from the required injection quantity is greater than the time of flight FDWP2 at the second point of inflection and smaller than the time of flight at the first point of inflection. This ensures that a switch to the characteristics curve in the full travel range takes place when it is already possible to trigger the injector in the full travel range in such a way that the desired time of flight is achieved.

To avoid instabilities of the method, the switch from using the characteristic curve in the partial travel range, to the characteristics curve in the full travel range always takes place for as long as the desired time of flight is less than the time of flight at the first point of inflection, minus a first minimum distance ΔFD,1. This ensures that the method never uses a node of the characteristics curve that is located in the direct vicinity of, or directly at, the first point of inflection, which could lead to instabilities of the method. First minimum distance ΔFD,1 is advantageously selected such that it absorbs the drift of the characteristics curve to be expected between two cycle-based detections of the characteristics curve during normal operation, which means that a stable control of the injector is possible at all times.

In analogous manner, it is also provided that a switch from the characteristics curve in the full travel range to the characteristics curve in the partial travel range takes place no later than at the instant when the desired time of flight is less than the time of flight at the second point of inflection, plus a second minimum distance ΔFD,2. This, too, ensures that the characteristics curve in the direct proximity of the second point of inflection will not be used and that the method according to the present invention runs in a stable manner.

To allow the detection of drift of the characteristics curve that occurs during operation, the first point of inflection and/or the second point of inflection, or the local maximum and the local minimum, are/is determined anew at regular intervals. For instance, it is possible to count a certain operation period of the internal combustion engine, and to detect the characteristics curve of the injector including the points of deflection and the local extreme values after a predefined operating period has elapsed, and to update the times of flight associated with the points of inflection and to store them in a memory.

Furthermore, in order to fully utilize the advantages of the method according to the present invention, each injector of an internal combustion engine is operated according to the method of the present invention and the points of inflection or the local extreme values are determined individually for each injector. This makes it possible to operate each cylinder of the internal combustion engine in optimal manner across the entire service life, so that the total emissions of the internal combustion engine are also at a constantly low level.

Since the switch from the characteristics curve of the partial travel range to the characteristics curve of the full travel range, and vice versa, is set up to occur at different limits, that is to say, the distance to the first point of inflection or the second point of inflection, a hysteresis results in the switch between the ranges of the characteristics curve, so that the method dwells longer in a particular range of the characteristics curve and the number of changes from one range of the characteristics curve to another range of the characteristics curve is able to be reduced. Furthermore, so-called toggling in the direct vicinity of the first point of inflection and the second point of inflection is avoided. This toggling, too, is undesired since it reduces the stability of the control of the injector.

Of special importance is the realization of the method according to the present invention in the form of a computer program which is able to run on a computer or a processing unit of a control device, and which is suitable for executing the method. The computer program may be stored on an electronic storage medium, for example, the storage medium in turn being part of the control device, for instance.

Further advantages, features and details result from the following description, in which different exemplary embodiments of the present invention are shown with reference to the drawing. In this context, the features mentioned in the claims and the description may be essential to the present invention either individually in isolation or in any combination.

DETAILED DESCRIPTION OF THE INVENTION

Figures 1A, 1B, 1C:
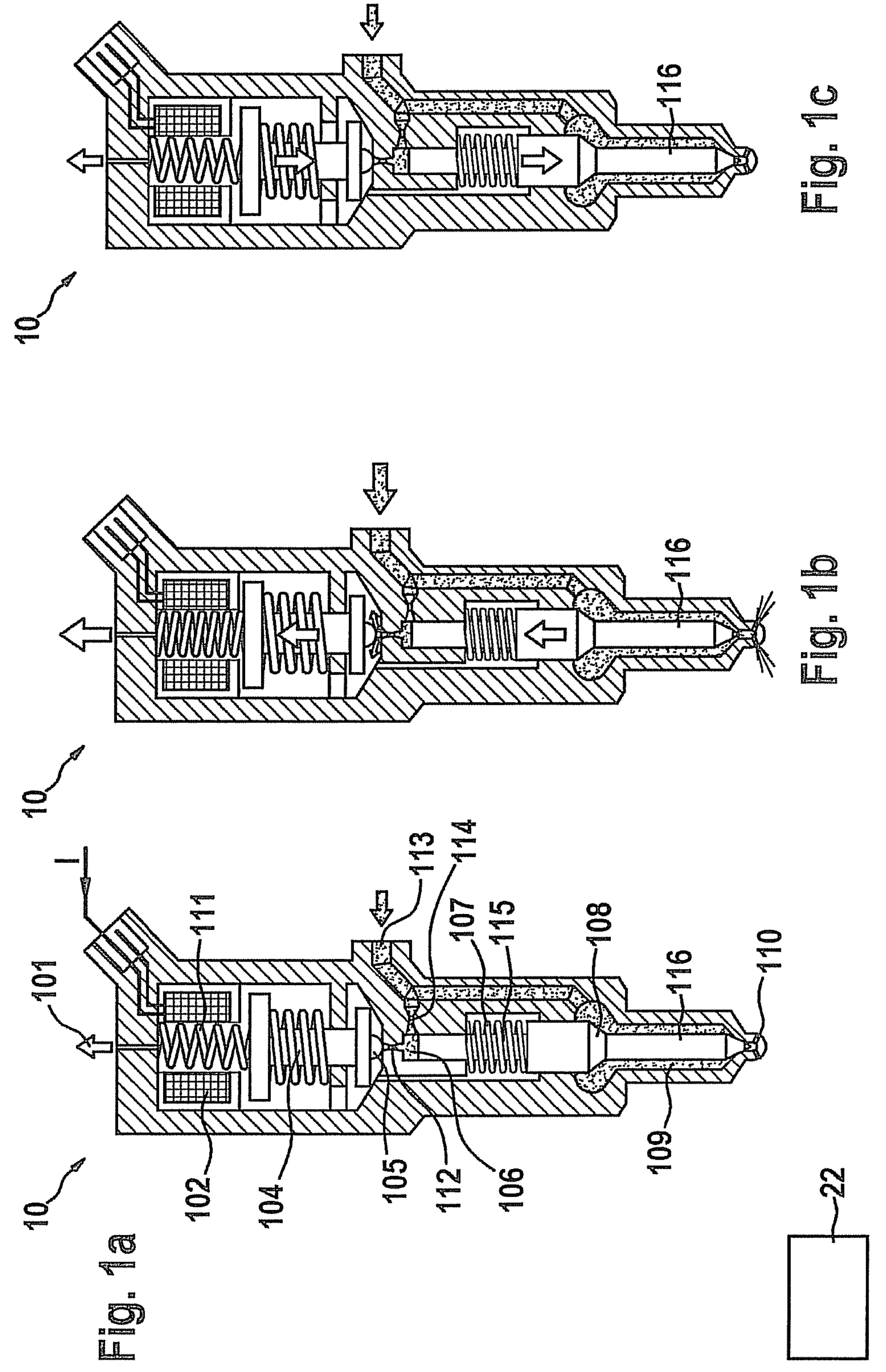
FIGS. 1*a*-1*c* show schematic illustrations of an injector suitable for implementing the method according to the present invention.

FIGS. 1*a* through 1*c* show a specific development of a fuel injector 10 provided for the injection of fuel, into an internal combustion engine in different operating states of an injection cycle.

FIG. 1*a* shows injector 10 in its neutral state, in which it is not actuated by control device 22 assigned to it. A solenoid valve spring 111 presses a valve ball 105 into a seat of outlet restrictor 112 provided for this purpose, so that a fuel pressure corresponding to the rail pressure is able to be generated in valve control chamber 106, as it also prevails in the region of high-pressure port 113.

The rail pressure is also applied in chamber volume 109 which surrounds valve needle 116 of injector 10. Valve needle 116 is kept closed against an opening force acting on pressure shoulder 108 of valve needle 116 by the forces applied to the end face of control plunger 115 by the rail pressure, and the force of nozzle spring 107.

FIG. 1*b* shows fuel injector 10 in its open state, which it assumes when actuated in the following manner by control device 22, starting from the neutral state shown in FIG. 2*a*: Electromagnetic actuator 102, 104, which in this case is made up of solenoid coil 102 denoted in FIG. 2*a* and solenoid armature 104 cooperating with solenoid coil 102, is acted upon by control device 22 by an actuation current I forming an actuation signal, in order to open solenoid valve 104, 105, 112 operating as control valve in the case at hand. The magnetic force of electromagnetic actuator 102, 104 exceeds the spring force of valve spring 111 (FIG. 1*a*), which causes solenoid armature 104 to lift valve ball 105 off its valve seat and thereby opens outlet restrictor 112.

As soon as outlet restrictor 112 opens, fuel is able to drain into a fuel reservoir (not shown) from valve control chamber 106 in the cavity situated above in FIG. 1*b*, see the arrows, and via a fuel return line 101. Inlet restrictor 114 prevents complete pressure equalization between the rail pressure applied in the region of high-pressure port 113 and the pressure in valve control chamber 106, so that the pressure in valve control chamber 106 drops. As a result, the pressure in valve control chamber 106 becomes lower than the pressure in chamber volume 109, which continues to correspond to the rail pressure. The reduced pressure in valve control chamber 106 causes a correspondingly reduced force on control plunger 115 and thus leads to opening of injector 10, i.e., to valve needle 116 being lifted off its valve needle seat in the region of spray-discharge orifices 110. This operating state is illustrated in FIG. 1*b*.

Then, i.e., once the valve needle has lifted off from the valve needle seat, valve needle 116 executes an essentially ballistic trajectory, primarily under the influence of the hydraulic forces in chamber volume 119 and in valve control chamber 106. Given an actuation period of sufficient length, during which actuation current I is applied to solenoid coil 102, however, valve needle 116 may also reach a needle travel stop (not shown) in its opening movement, which defines the maximum needle travel. In this case, injector 10 is said to be operated in its full travel range.

As soon as electromagnetic actuator 102, 104 (FIG. 1*a*) is no longer actuated by control device 22 at an end of the actuation period, valve spring 111 exerts downward pressure on solenoid armature 104, as shown in FIG. 1*c*, so that valve ball 105 subsequently seals outlet restrictor 112. This causes the renewed generation of rail pressure in control chamber 106. This pressure in control chamber 106, which is now increased, exerts greater force on control plunger 115, which, in conjunction with the force of nozzle spring 107, exceeds the force acting on valve needle 116 in the region of chamber volume 109, and which therefore returns valve needle 116 to its closing position again.

Figure 2:
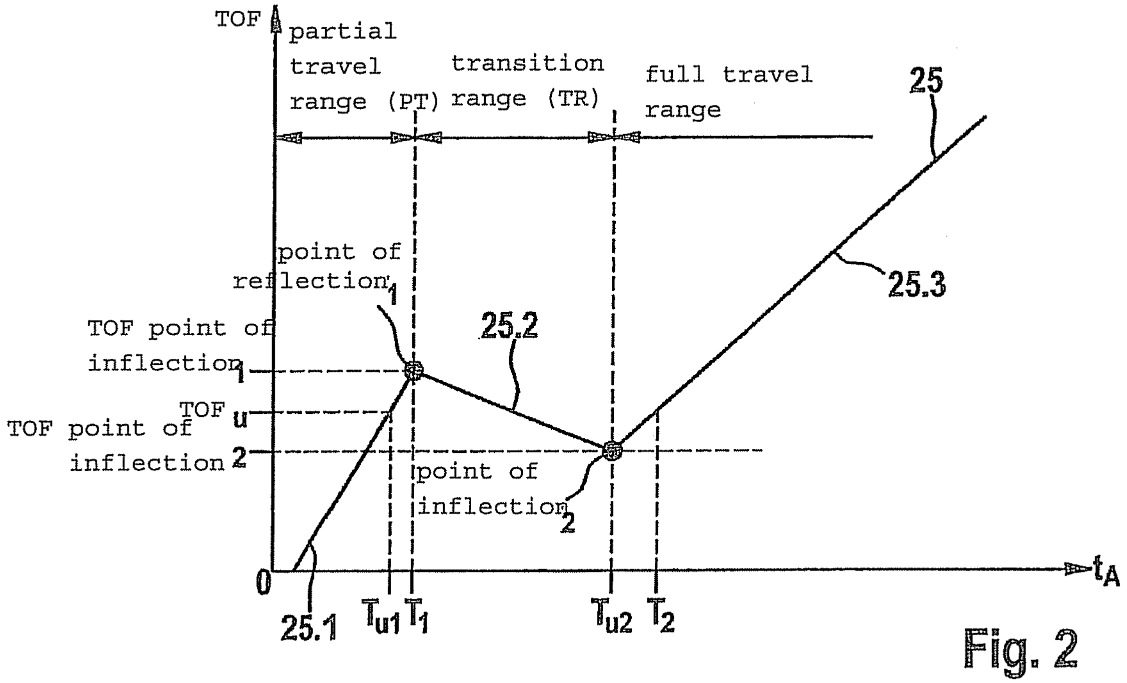
FIG. 2 shows an exemplary, schematic illustration of the characteristics curve of an injector.

The fuel injection has ended as soon as valve needle 116 reaches its valve needle seat in the region of spray-discharge orifices 110 and seals them, see FIG. 1*c*. FIG. 2 shows the characteristics curve of an injector 10 by way of example, actuation period $T_A$ being plotted on the X-axis, and time of flight FD being plotted on the Y-axis.

Characteristics curve 25 is subdividable into three ranges. The first range begins in the direct vicinity of the origin and ends at instant $T_1$. This first range is denoted as partial travel range TH, due to the fact that valve needle 13 does not open completely in this range and does not strike the travel stop. In partial travel range TH, characteristics curve 25.1 is relatively steep and frequently non-linear. However, to simplify matters, the first range of characteristics curve 25.1 is shown as a straight line in FIG. 2. A characteristic of first range TH is that characteristics curve 25.1 rises in monotonous manner. At an actuation period $t_A=T_1$, characteristics curve 25 has a first point of inflection WP1, or a first local maximum. With actuation periods $t_A>T_1$, time of flight FD drops again, to the point at which a second turn of inflection WP2, or a second local maximum, is attained at an actuation period $t_A=T_2$.

If actuation period $t_A>T_2$ is then selected, characteristics curve 25.3 rises again monotonously and usually has a very linear characteristic. This means that the actuation of the injector using actuation periods $t_A>T_2$ is easy to control in terms of control technology, and that an excellent linear correlation exists between the actuation period and time of flight FD or the injected fuel quantity resulting therefrom.

Until now, the operating range of the injector has been restricted to full travel range VH at actuation periods $t_A>T_2$, since especially in transition range ÜB, the metering accuracy drops and, in particular, the deviation between different specimens of injectors having the same design increases considerably. This, too, reduces the metering accuracy.

Figure 3:
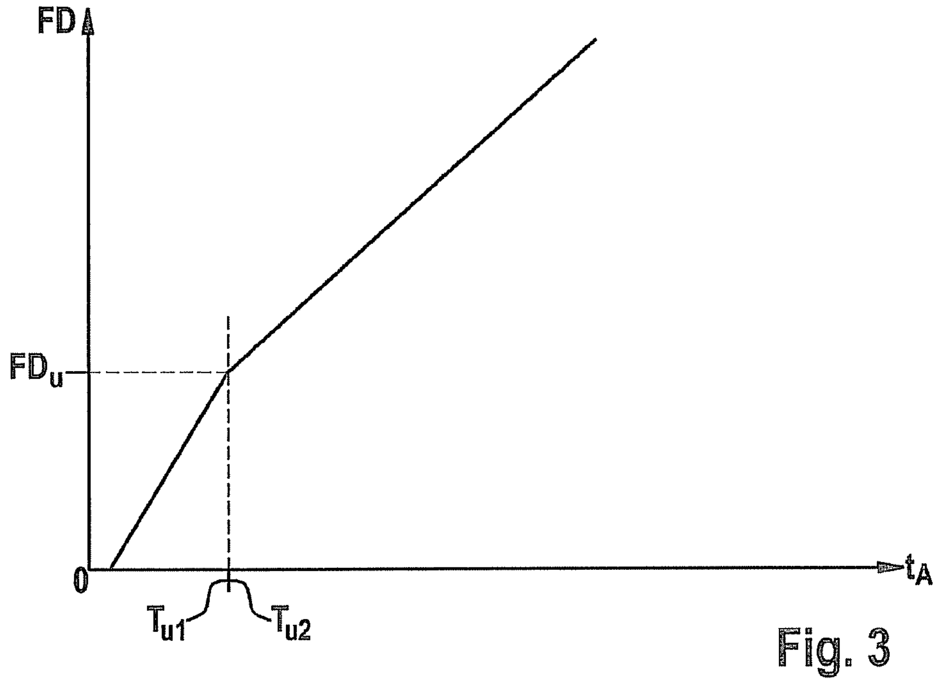
FIG. 3 shows the characteristics curve according to FIG. 2, with a suppressed transition range.

In order to circumvent this problem, the present invention provides for a suppression of transition range 25.2 of the characteristics curve, and for composing a monotonously rising characteristics curve from ranges 25.1 and 25.3 of characteristics curve 25. Such a combined, monotonously rising characteristics curve is shown in FIG. 3. In order to achieve a monotonously rising characteristics curve, a switch between the two components 25.1 and 25.3 of characteristics curve 25 must take place at a specific time of flight, i.e., at the so-called switchover time of flight $FD_U$ (see FIG. 2). This means that with an actuation period $FD<FD_U$, first range 25.1 of the characteristics curve will be utilized, and at actuation periods or times of flight $FD>FD_U$, range 25.3 of the characteristics curve will be analyzed. In this way trigger durations $t_A<TU_1$ may be used to control fuel injector 10 in the case of small injection quantities. For greater injection quantities, the actuation period is $t_A>TU_2$. The range between $TU_1$ und $TU_2$ is never actuated, except for determining the points of inflection, so that transition range ÜB is suppressed. This makes it possible to increase the metering accuracy and thus the operating behavior of the internal combustion engine.

An essential feature of the transition range is that a first point of inflection $WP_1$ and/or a local maximum is present between first range 25.1 and second range 25.2 of characteristics curve 25. According to the present invention, this first point of inflection $WP_1$ or the local maximum may be used for separating partial travel range TH from transition range ÜB. Analogously, it is possible to use second point of inflection $WP_2$, which is situated between second range 25.2 and third range 25.3 of characteristics curve 25, to separate these ranges from each other.

Figure 4:
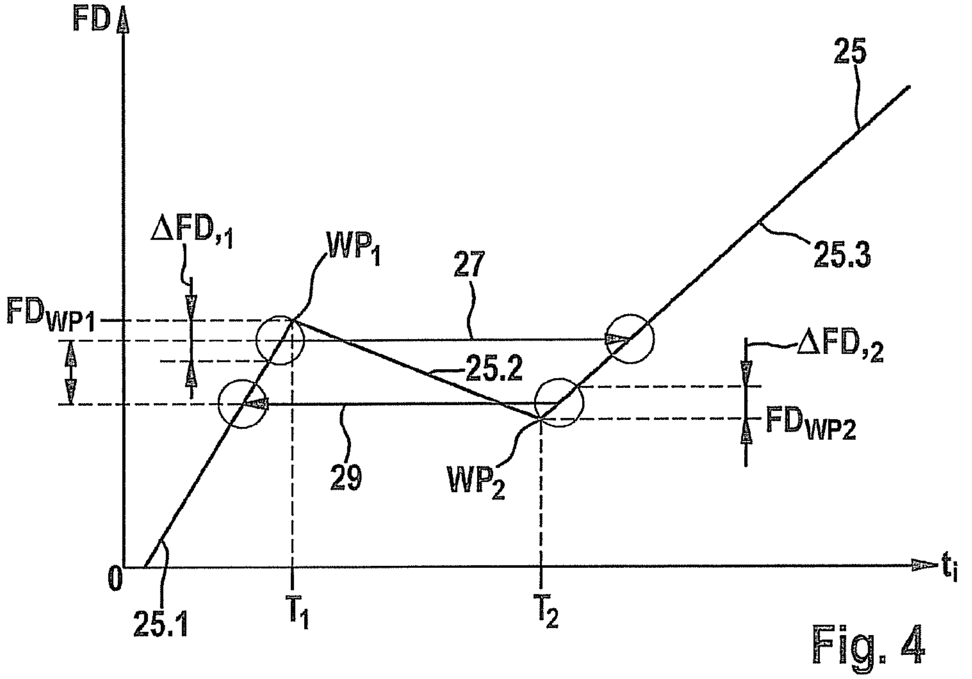
FIG. 4 shows an explanation of the method according to the present invention, including a hysteresis

In the simplified illustration according to FIGS. 2 through 4, characteristics curve 25 is made up of three straight segments. However, especially first range 25.1 and second range 25.2 are not linear in many injectors from series production, so that curved or non-linear segments of characteristics curve 25 may occur as well, which are also able to be handled by the method according to the present invention.

According to the present invention, it is now provided to determine first point of inflection $WP_1$ and second point of inflection $WP_2$ at regular intervals, such as after one hundred operating hours of the injector, for example, and to record associated actuation periods $T_1$ and $T_2$ and the associated times of flight $FD_{WP1}$ and $FD_{WP2}$. As an alternative to recording points of inflection $WP_1$ and $WP_2$, it is also possible to record the boundary between partial travel range TH and transition range ÜB by determining a local maximum of characteristics curve 25. In analogous manner, the boundary between transition range ÜB and full travel range VH is able to be recorded by determining a local minimum, and specified.

Whether points of inflection or local extreme values are utilized for delimiting the different ranges may be decided as a function of the characteristics curve of the injector.

FIG. 4 shows an exemplary embodiment of the method according to the present invention, for which a hysteresis is provided in the suppression of transition range ÜB, so that the switch from first segment 25.1 of the characteristics curve to third segment 25.3 of the characteristics curve takes place less often, which results in a more stable method.

Starting from small actuation periods $t_A$ that are much smaller than $T_1$, segment 25.1 of the characteristics curve is utilized for calculating time of flight FD. This is done until actuation period $t_A$ approaches value $T_1$. To be more precise, time of flight FD resulting from the actuation period is checked as to whether the desired time of flight required for achieving a predefined injection quantity is smaller than time of flight $FD_{WP1}$ at the first point of inflection, minus a first minimum distance $\Delta FD_1$. First minimum distance $\Delta FD_1$ is plotted in FIG. 4. This switch from first segment 25.1 to third segment 25.3 of the characteristics curve with increasing actuation period $t_A$ is indicated by a first arrow 27 in FIG. 4. For injection quantities that are increasing further, actuation period $t_A$ is then calculated with the aid of third segment 25.3 of characteristics curve 25.

If the injection quantity is to be reduced, this naturally leads to shortened actuation periods $t_A$. Since the method in this state is based on third segment 25.3 of the characteristics curve, actuation period $t_A$ drifts towards smaller values in the direction of $T_2$ with increasingly smaller injection quantities. $T_2$ is the actuation period which results if second point of inflection $WP_2$ of the characteristic curve is actuated. As soon as actuation period $t_A$ or time of flight FD resulting therefrom is less than time of flight $FD_{WP2}$ at the second point of inflection, plus a second minimum distance $\Delta FD_{,2}$, another switch takes place to first segment 25.1 of the characteristics curve. This switch is indicated by second arrow 29. Since first arrow 27 and second arrow 29 are set apart from each other in the direction of the Y-axis, this results in a hysteresis of the method, or a hysteresis in the switchover or the change from one segment of the characteristics curve to the other segment of the characteristics curve, which increases the stability of the method. Since first minimum distance $\Delta FD_{,1}$ and second minimum distance $\Delta FD_{,2}$ depend on first point of inflection $WP_1$ or second point of inflection $WP_2$ in each case, the hysteresis is automatically adapted also by the renewed determination of points of inflection $WP_1$ and $WP_2$, so that this hysteresis function, too, is active across the entire service life of the internal combustion engine, regardless of the drift of characteristics curve 25.

Figure 5:
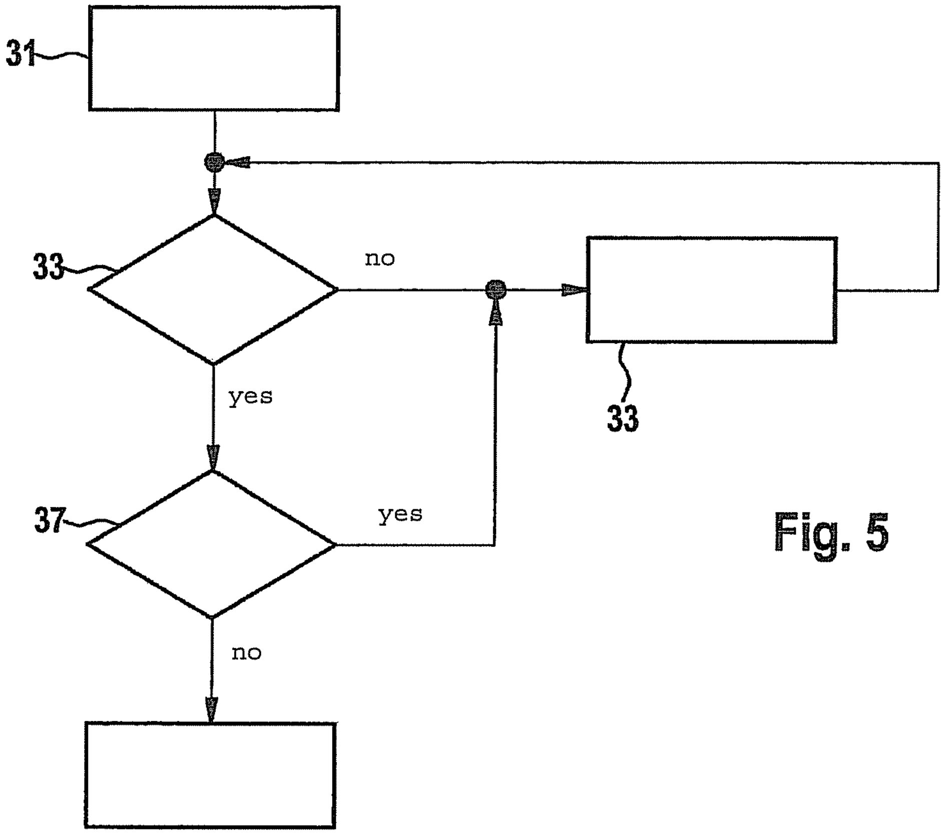
FIG. 5 shows a flow chart of one specific embodiment of the method according to the present invention.

FIG. 5 shows an exemplary embodiment of the method according to the present invention, in the form of a circuit diagram. In a first function block 31, the so-called pilot control of the injector is implemented. In a first decision block 33, it is queried whether first point of inflection $WP_1$ and/or second point of inflection $WP_2$, or a first local maximum and a second local minimum, are present. If this query is answered in the negative, transition range ÜB of the characteristics curve is measured in a second function block 35.

This is done by actuating injector 10 using different actuation periods $t_A$, and recording the associated times of flight FD. The detection of the times of flight may be performed according to a method known from the related art. For instance, the nodes of the characteristics curve may be recorded in normal operation and in an expanded useful range of the characteristics curve or in a special injection mode.

Nodes of a current characteristics curve 25 result from the detection of the times of flight at actuating periods of different lengths. As soon as a sufficient number of nodes has been detected, the new current characteristics curve formed in this manner may be checked as to where first point of inflection $WP_1$ or a local maximum, and second point of inflection $WP_2$ or a local minimum are to be found. If first point of inflection $WP_{1,neu}$ and second point of inflection $WP_{2,neu}$ differ markedly from the previously stored points of inflection, then drift of characteristics curve 25 has taken place and the new values for the point of inflection are stored and the method according to the present invention is implemented on the basis of the newly stored points of inflection. When the points of deflection have been detected, so that the query in branching 33 is able to be answered by "yes", it is queried in a second query block 37 whether cyclical remeasuring of characteristics curve 25 and the determination of the points of inflection or the transition range is required. If this query is answered by "yes", branching to second function block 35 takes place in the method, the characteristics curve is remeasured again and transition range ÜB is determined as a function of newly determined points of inflection $WP_1$ and $WP_2$.

If the query in second branching block 37 is negative, transition range ÜB in the characteristics curve is skipped and a monotonous characteristics curve is composed of ranges 25.1 and 25.3 of characteristics curve 25. With the aid of this monotonous characteristics curve 25, as it is shown in FIG. 3, for instance, injector 10 can now be actuated and exceedingly high metering accuracy be achieved across the entire operating range of the injector. A special advantage of the method according to the present invention is that drift of the injector is detectable as well and accordingly, by a modified/adapted definition of transition range ÜB, its suppression takes place. This makes the metering accuracy virtually constant across the entire service life of the internal combustion engine.

What is claimed is:

1. A method for operating a valve of at least one fuel injector of an internal combustion engine of a motor vehicle, comprising:

controlling actuation of the fuel injector by applying at least one actuating variable including at least one of an actuating current and an actuating voltage during an actuation period of the fuel injector in order to influence an operating state of the fuel injector;

wherein:

the actuation of the fuel injector is controlled in accordance with at least one selected portion of a characteristic curve of the time of flight of a valve element;

the characteristic curve is subdivided into multiple ranges each featuring a monotonous change of the time of flight at a corresponding actuation period, the multiple ranges including a partial travel range, a transition range, and a full travel range;

the transition range is defined by a transition between a first point of inflection to a second point of inflection of the characteristic curve of the time of flight of the valve element;

the first point of inflection lies at the transition between the partial travel range and the transition range, and the second point of inflection lies at the transition between the transition range and the full travel range;

the first point of inflection is assigned a first time of flight, and the second point of inflection is assigned a second time of flight, and the first time of flight at the first point of inflection is greater than the second time of flight at the second point of inflection; and the at least one selected portion of the characteristic curve of the time of flight of the valve element used for the control of the actuation of the fuel injector excludes the transition range.

2. The method as recited in claim 1, wherein the the valve element is a valve needle of the fuel injector.

3. The method as recited in claim 2, wherein:

at least one of the first point of inflection and the second point of inflection of the characteristic curve is determined by determining the times of flight associated with different actuation periods.

4. The method as recited in claim 1, wherein a switch from the use of the partial travel range of the characteristic curve to the full travel range of the characteristic curve for the control of the actuation of the fuel injector takes place when the desired time of flight of the valve element is greater than the second time of flight at the second point of inflection and smaller than the first time of flight at the first point of inflection.

5. The method as recited in claim 1, wherein a switch from the use of the partial travel range of the characteristic curve to the full travel range of the characteristic curve for the control of the actuation of the fuel injector takes place when the desired time of flight of the valve element is greater than the value of the first time of flight at the first point of inflection minus a first predetermined minimum distance.

6. The method as recited in claim 1, wherein a switch from the use of the full travel range of the characteristic curve to the partial travel range of the characteristic curve for the control of the actuation of the fuel injector takes place when the desired time of flight is smaller than the value of the second time of flight at the second point of inflection plus a second predetermined minimum distance.

7. The method as recited in claim 3, wherein at least one of the first point of inflection and the second point of inflection of the characteristic curve is newly determined at regular intervals.

8. The method as recited in claim 3, wherein a plurality of fuel injectors are provided in the internal combustion engine and operated.

9. The method as recited in claim 3, wherein the characteristic curve is determined during normal operation.

10. A non-transitory computer-readable data storage medium storing a computer program having program codes which, when executed on a computer, performs a method for operating a valve of a fuel injector of an internal combustion engine of a motor vehicle, the method comprising:

controlling actuation of the fuel injector by applying at least one actuating variable including at least one of an actuating current and an actuating voltage during an actuation period of the fuel injector in order to influence an operating state of the fuel injector;

wherein:

the actuation of the fuel injector is controlled in accordance with at least one selected portion of a characteristic curve of the time of flight of a valve element;

the characteristic curve is subdivided into multiple ranges each featuring a monotonous change of the time of flight at a corresponding actuation period, the multiple ranges including a partial travel range, a transition range, and a full travel range;

the transition range is defined by a transition between a first point of inflection to a second point of inflection of the characteristic curve of the time of flight of the valve element;

the first point of inflection lies at the transition between the partial travel range and the transition range, and the second point of inflection lies at the transition between the transition range and the full travel range;

the first point of inflection is assigned a first time of flight, and the second point of inflection is assigned a second time of flight, and the first time of flight at the first point of inflection is greater than the second time of flight at the second point of inflection; and the at least one selected portion of the characteristic curve of the time of flight of the valve element used for the control of the actuation of the fuel injector excludes the transition range.

11. A control device for a fuel injector of an internal combustion engine of a motor vehicle, comprising:

a control unit for controlling actuation of the fuel injector by applying at least one actuating variable including at least one of an actuating current and an actuating voltage during an actuation period of the fuel injector in order to influence an operating state of the fuel injector;

wherein:

the actuation of the fuel injector is controlled in accordance with at least one selected portion of a characteristic curve of the time of flight of a valve element;

the characteristic curve is subdivided into multiple ranges each featuring a monotonous change of the time of flight at a corresponding actuation period, the multiple ranges including a partial travel range, a transition range, and a full travel range;

the transition range is defined by a transition between a first point of inflection to a second point of inflection of the characteristic curve of the time of flight of the valve element;

the first point of inflection lies at the transition between the partial travel range and the transition range, and the second point of inflection lies at the transition between the transition range and the full travel range;

the first point of inflection is assigned a first time of flight, and the second point of inflection is assigned a second time of flight, and the first time of flight at the first point of inflection is greater than the second time of flight at the second point of inflection; and the at least one selected portion of the characteristic curve of the time of flight of the valve element used for the control of the actuation of the fuel injector excludes the transition range.

* * * * *